(12) United States Patent
Rumpler et al.

(10) Patent No.: US 7,838,080 B2
(45) Date of Patent: Nov. 23, 2010

(54) METHOD FOR PRODUCING UREA PELLETS

(75) Inventors: Karlheinz Rumpler, Weimar (DE); Bernhard Wand, Apolda (DE); Michael Jacob, Weimar (DE); Reinhard Bober, Weimar (DE); Reinhard Nowak, Binzen (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 356 days.

(21) Appl. No.: 12/063,337

(22) PCT Filed: Aug. 1, 2006

(86) PCT No.: PCT/EP2006/007598

§ 371 (c)(1),
(2), (4) Date: Feb. 8, 2008

(87) PCT Pub. No.: WO2007/017159

PCT Pub. Date: Feb. 15, 2007

(65) Prior Publication Data

US 2009/0124489 A1    May 14, 2009

(30) Foreign Application Priority Data

Aug. 10, 2005   (DE) .................. 10 2005 037 750

(51) Int. Cl.
  *B01J 31/02* (2006.01)
  *C07C 273/02* (2006.01)
  *B05C 3/00* (2006.01)
(52) U.S. Cl. .................. 427/430.1; 502/167; 564/63
(58) Field of Classification Search .................. None
See application file for complete search history.

(56) References Cited

U.S. PATENT DOCUMENTS

| 3,231,413 | A | 1/1966 | Berquin |
| 6,391,454 | B1 * | 5/2002 | Mao et al. .................. 428/407 |
| 2004/0228978 | A1 * | 11/2004 | Jacob et al. .............. 427/430.1 |

FOREIGN PATENT DOCUMENTS

| DE | 2908136 | 9/1979 |
| DE | 3117892 | 3/1982 |
| DE | 69310629 | 5/1997 |
| DE | 10252734 | 5/2004 |
| DE | 10322062 | 12/2004 |
| DE | 10326231 | 2/2005 |
| DE | 19724142 | 4/2007 |

(Continued)

*Primary Examiner*—Melvin C Mayes
*Assistant Examiner*—Yun Qian
(74) *Attorney, Agent, or Firm*—Volpe and Koenig, PC

(57) ABSTRACT

A method for producing urea pellets having a narrow range of grain sizes and a sphericity >75% and a defined residual moisture ≦0.5% is provided. The method provides urea pellets having the properties required which meet the requirements of the automotive industry for use thereof in reducing emissions from diesel engines. The method includes spraying a urea-containing liquid having a temperature between ambient temperature and above the melting point of the urea into the high particle density region of the spray zone of a near circular gas, material flow of a spouted bed apparatus and onto the particle surface of the material, which is dried and granulated in the gas flow at a temperature of not more than 130° C. at a controlled heat and mass transfer rate while being separated.

17 Claims, 1 Drawing Sheet

FOREIGN PATENT DOCUMENTS

Figure 1:
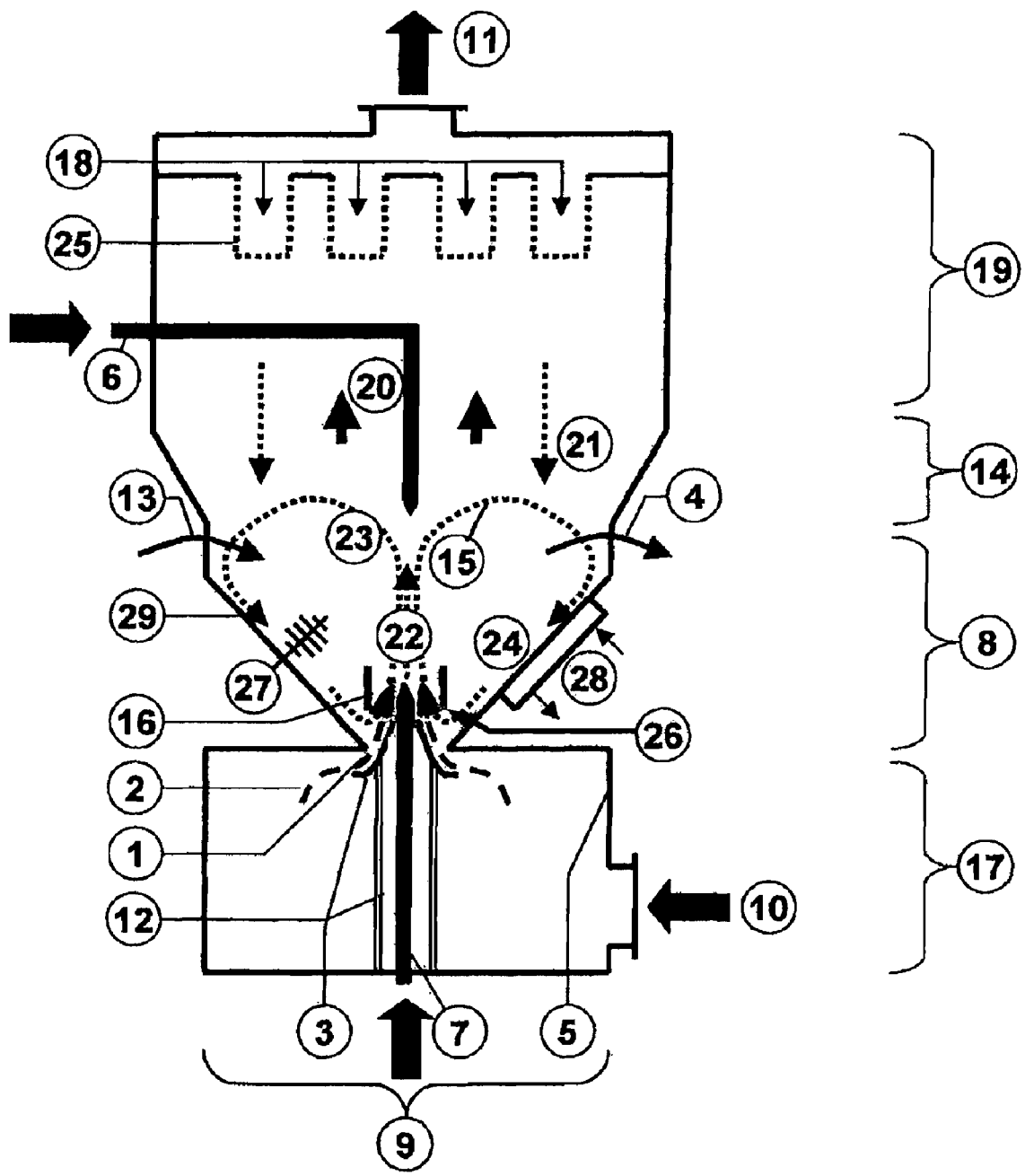

| | | |
|---|---|---|
| EP | 0026918 | 5/1984 |
| EP | 1325775 | 7/2003 |
| EP | 1136465 | 4/2005 |
| JP | 56079664 | 6/1981 |
| JP | 56100756 | 8/1981 |
| WO | 2004101132 | 11/2004 |

* cited by examiner

METHOD FOR PRODUCING UREA PELLETS

BACKGROUND

The invention relates to a process and/or a method for producing urea pellets having the features mentioned in the preamble of claim 1.

In motors and particularly in the motor vehicle industry it is problematic to clear the exhaust of diesel engines, for example in motor vehicles, from nitrous oxides (NOx, denitrification). This serves for environmental protection and only by doing so can the regulations regarding Euronorm 5 and 6 be fulfilled. Ammonia is necessary for the denitrification of such exhausts using SCR-technology (selective catalytic reduction). It is rather impractical to carry bottled ammonia along in the vehicles and impossible for safety reasons. An easily handled ammonia carrier was demanded and has been found in the form of urea. Urea provides the ammonia necessary for the catalytic removal of nitrous oxides from exhausts of diesel engines. In order to allow this urea to be used for the denitrification of diesel exhaust in the interest of high performance it must be provided in a concentrated form, thus as a granulate of solid matter, which in comparison to possibly also aqueous solutions is advantageous in that no heating of the tank is necessary to avoid freezing. Due to the need for a precise dosing of urea granulates in respective devices to release ammonia from urea, a high quality standard of urea granulates is necessary. In particular, grain size, density, and solidity are to comply with certain specifications.

The use of urea granulates is known in the fertilizer industry. Here, prilling towers, fluidized bed arrangements, granulators, etc. are the state of the art for their production.

From DE 29 08 136 a method is known to produce urea granulates in a fluidized bed, in which solid, powdered urea is placed onto a fluidized bed and serve as seeds for the urea granulates to be produced. In the fluidized bed these seeds are sprayed with a liquid comprising the material to be included in the urea seed particles. The liquid adheres to the urea particle seeds and the material granulates thus produced are dehydrated and solidified in the fluidized bed.

This method is disadvantageous in that an agglomeration of urea seeds cannot be avoided and a homogeneous structure of the product to be produced cannot be achieved by spraying so that a final material develops having different and inhomogeneous qualities and compositions.

From DE 197 24 142 A1 the production of granulated composite fertilizer is known using melt-suspensions. The melt-suspensions comprise a mixture of melted urea and fine-grained granulated inorganic salts, which are added at temperatures above the melting point of a fluidized bed known per se with a classified outlet of the finished product via the bottom of the fluidized bed, and which are injected into the fluidized bed via pressurized nozzles from the bottom and in the direction of the flow of the fluidized medium. The temperature of the injected whirling air, creating and maintaining the fluidized bed and accepting the crystallization heat of the introduced melt-suspension, is below the melting temperature of the melt so that a defined solidification and granulation of the melt-suspension in the fluidized bed occurs at temperatures ranging from 95 to 105° C. forming granulates, in which 95% of the material shows a grain size ranging from 1.6-5 mm and shows a biuret content <0.8 M-%. Biuret is a decomposition product of urea, which primarily develops during heating under ammonia separation.

From DE 31 17 892 A1 a spouted bed apparatus is known for the production of granulates, in which a liquid is inserted into the flow of solid matter of a spouted bed granulator. The spouted bed granulator has a circular cross-section, with its bottom part being embodied conically constricted. A gas channel, in which a nozzle for injecting the liquid is arranged, mouths into the central conical part of the spouted bed granulator. A respective gas is fed through the gas channel to maintain the fluidized bed. The centrally introduced gas entrains the liquid inserted by the nozzle and a portion of the material located in the jet bed granulator. Here, a more or less defined spray zone develops, in which the material particles can come into contact with the liquid. The sprayed material is reintroduced to the spouted bed via the cone-shaped floor so that a particle circuit develops. When an appropriate granulate size has been reached the particles are removed from the spouted bed granulator.

In this type of spouted bed granulator, the introduction of the gas to create the fluidized bed and the liquid to be introduced enter at a common place in the lower part of the spouted bed granulator. The particles falling back are slowed down by the vertically flowing fluidization means (air), are entrained, and deflected upwards. Here, in particular in case of larger particle amounts, pulsation can develop as well as inhomogeneous particle concentrations in the proximity of the nozzles, resulting in an inhomogeneous coating of the particles. The relative large open area of the gas entry in form of a circular ring tends to form air hanks, and thus an inhomogeneous flow. In order to achieve stable processing conditions the device must be operated at higher air flow speeds, thus the fluidization conditions cannot be adjusted freely, solely depending on optimum processing conditions. The excessive gas speeds yielded here in the proximity of the nozzles lead to the development of dust by spray drying and/or spray crystallization and the developing dust adheres to other particle surfaces during the spraying process and reduces the surface quality and the homogeneity (e.g., sphericity) of the product. For these reasons a homogeneous wetting of the material particles to be treated is hardly realized or not at all. Some material particles are sprayed with too much liquid, others with too little, so that a final product cannot be achieved that has an even grain size and a homogeneous material structure. Additionally the arrangements are only suitable for the granulation of small material throughputs, in larger throughputs problems develop with regard to create and maintain the fluidized bed.

Additional publications, such as DE 31 17 892, DE OS 102 52 734, DE 693 10 629, EP 0 026 918, and EP 1 136 465 include methods, in part also for the production of urea pellets, which are however unsuitable to produce urea pellets meeting the necessary high requirements set by the automotive industry, in particular to achieve a very narrow range of grain sizes, high sphericity, a smooth surface, and a low defined residual moisture.

All known methods for producing urea granulates have the common disadvantage that the fabricated bulk product, i.e., urea granulate, complies insufficiently or not at all with the specifications set for the exhaust denitrification of diesel engines. The granulates are insufficiently spherical, have a wide range of grain sizes, and fail to have a smooth surface.

On the other hand, from DE 103 22 062 A1 a method and a device are known for the application of liquids in a solid flow of a spouted bed apparatus. Here, the supply air necessary to form a solid flow is introduced via a gap located in the lower area in the axial direction of the reaction chamber into a solid flow in an approximately axial direction of the reaction chamber of the spouted bed apparatus. The liquid is inserted into the material flow via one or more single or multi-way nozzles at one or more sites. Here, the flow conditions in the spray area can be adjusted so that the liquid can be applied to the material flow in a targeted and controlled manner. The finished product developing here is characterized in an almost homogeneous grain size having identical material features. Here, different final products can be produced by spraying pure liquids, solutions, melts, or the like by one or more single or multi-way nozzles into the material flow.

SUMMARY

The object of the invention is to provide a method for producing urea pellets, with their features fulfilling the requirements of the engine and particular motor vehicle industry for the use as an exhaust denitrification device for diesel engines, in particular overcoming the above-mentioned limits and shortcomings of methods of prior art.

This object is attained surprisingly well according to the invention by the characterizing features of claim 1, preferably in combination with those of one or more of the dependent claims.

Due to the fact that urea containing liquids, having a temperature ranging from ambient temperature to higher than the melting temperature of the urea, is sprayed into the area of high particle density of a spray zone of an almost circular gas-material flow of a spouted bed apparatus onto the particle surface of the material and at temperatures in the gas material flow up to slightly below the melting temperature of pure urea, in particular up to 130° C., dried and granulated under controlled heat and material transfer and simultaneously separated, a final material is defined having a narrow range of grain sizes and sphericity (according to Wedell the ratio of the surface of a voluminously equivalent sphere in reference to the actual surface, in the following listed in %)>75% and a defined residual moisture ≦0.5%, and particularly a distribution of grain sizes ±10% or less from the mean value, preferably ±8 percent or less from the mean value, even less than ±4 percent from the mean value, so that any caking of the produced urea pellets is avoided. Defined residual moisture represents in particular that the residual moisture can be determined empirically or theoretically in advance and then be reproduced.

Another advantage of the method according to the invention provides that by the method, the urea grain size can be adjusted to a required range of grain sizes from 1 to 5 mm, for example. The produced urea pellets are dust free and freely flowing, and show a round geometry with a smooth surface and little roughness. The grain size of the granulate of the product preferably shows a tolerance for variations in diameter of ≦10%. These urea pellets produced in a spouted bed apparatus having a grain size, density, and solidity, adjusted by the method, comply with the specifications of the motor vehicle industry for the use as means to denitrify the exhaust of diesel engines.

Another advantage of the process according to the invention to be mentioned is the very simple design of the fundamental spouted bed arrangement, which combines a high operational security and resistance to malfunctions with very good cleaning features and additionally the production of very large quantities.

Preferably, the urea pellets are conditioned, particularly coated, with conventional inorganic or particularly organic releasing agents, such as e.g., wax, polyolefins, ammonia salts of fatty acids, or the like, suitable for the use to produce ammonia for motor vehicles, i.e. under the condition of releasing ammonia from the urea for denitrification of exhaust without forming any residue (e.g., corrosive and/or evaporating ones). This can occur in the same device as the formation of urea pellets, in a subsequent (=located further towards the end of the device) section thereof, or preferably (particularly in case of coating) in one or more additional devices (e.g., prilling towers, spouted bed apparatus, drum coaters, or the like).

Other advantageous embodiments are described in the dependent claims; they are explained in the description together with their effects as well as any terms used. The invention also relates to the use of a spouted bed apparatus (preferably designed as defined above and in the following) for the production of urea pellets for the denitrification of exhaust, in particular of diesel motors, preferably according to the method mentioned.

The invention is explained in the following using an exemplary embodiment, which illustrates the invention in greater detail without limitations. In the respective drawing (FIG. 1) an arrangement for performing the method according to the invention is shown schematically—preferably the arrangement is illustrated such that it has the same form protruding in the cross-section shown in the drawing, i.e. seen from the top, thus having an approximately rectangular cross-section and an oblong shape. Particularly in connection with gap-shaped openings, this leads to a particularly homogeneous particle movement in the apparatus as a whole while forming a particle roller, providing for a better aligned movement towards the product output. The more homogenous particle movement and a narrow range of staying times allow a more homogeneous growth of the granulates by the spraying in reference to prior art.

In order to produce urea pellets, a urea containing liquid having a temperature ranging from the ambient temperature to above the melting temperature of urea is sprayed onto the particle surface of the material in a spouted bed apparatus in the area of high particle density of a spray zone 22 of the gas-material flow 15, almost circular (preferably roller-like, i.e. located around a longitudinal axis which is preferably approximately parallel in reference to one or more gap openings (1)), having in particular not a circular shape, and, being dehydrated and granulated at an adjustable, preferably controlled heat and material transfer with a simultaneous separation in the gas flow at temperatures up to below the melting temperature of pure urea, preferably up to 130° C. The urea-containing liquid injected into a processing chamber 8 of the jet layer apparatus via one or more nozzles 7 and/or 6 preferably comprises a urea solution, urea suspension, a urea melt, or a urea melt solution—the latter refers to a mixture formed by an only slight addition of solvent, such as water, with also opposite urea degraded melting point whereas the small solvent content not remaining in the final product, leading to particularly even granulates due to the slow dehydration.

For the granulation of the urea containing liquid a necessary amount of processing gas 10 is introduced via at least (and preferably no more than) one supply air chamber 17, here having an approximately rectangular cross-section 9 and limiting side walls 5. The introduced processing gas 10 has temperatures ranging from 20° C. to 250° C. In the supply air chamber 17 the processing gas 10 disperses and passes through one or more (particularly two) gap openings 1 (preferably oblong, extending approximately parallel in reference to the horizontal) into a processing chamber 8 in the form of one or more (preferably two) gas flows 2. The processing gas preferably entering horizontally through gap openings 1 is deflected by one or more (preferably two) deflection parts 3, which may be adjustable and which preferably are embodied approximately such that they ensure a curved guidance of the processing gas in the feeding section approximately perpendicular in reference to the longitudinal plane of the spouted bed apparatus and in the direction thereof or through at least one gap-shaped opening 1 and in the outlet area (opening area into the processing chamber 8) approximately parallel to the longitudinal plane upwardly, preferably upwardly into the processing chamber 8, and that it enters the apparatus as a type of free flow. By this arrangement a particularly homogeneous particle flow can be adjusted, in particular when the reflux (in contrast to prior art) occurs such that the particles are slowed down by the side walls of the reflux zone 24 and enter the gas flow laterally. Furthermore the cross-section of the device can optionally widen in an expansion zone 14, so that the speed of the upward flow of the processing gas constantly slows down. The gas exits the arrangement in form of exhaust 11 above the expansion zone 14 via an outlet part 19, in which optionally at least one dedusting device 25 can be integrated, e.g., one or more filter cartridges and/or textile filter elements or the like.

In the processing chamber 8 an amount of urea particles ("material") is located, which is entrained upwards by the flow of processing gas. In the upper area of the processing chamber 8 as well as in the expansion zone 14 located thereabove the speed of the gas reduces, so that the particles flowing upwards laterally exit the gas flow 23 and fall back into the processing chamber 8. The processing chamber 8 is limited in the lower section by one or preferably several (here two) inclined lateral walls 29. Due to this lateral incline the particles are transported under the effect of gravity via a reflux zone 24 in the direction of the gas entry gap or gaps 1, where they then once more are entrained by the processing gas into the processing chamber 8. Preferably a pressure difference can be adjusted by a preferably gap-shaped gas entry gap 1 according to the processing requirements, in contrast to prior art, and this way the homogeneity of the gas entry and a reduction of potentially present dead zones can be achieved. The influx cross-section can preferably be adjusted smaller than in prior art so that the fluidization conditions can be adjusted more precisely.

By this mechanism, a very homogenous circulation of the solid matter develops in one or more (preferably two) almost circular (preferably approximately roller-like, i.e. roller shaped or almost roller shaped) gas material—flow(s) 15. Here, each circular-like gas-material flow 15 comprises an upward flow and a reflux in the direction of the processing gas entry. This way, high particle density results in the core zone above each deflection part 3, even in case of very small amounts of particles in the processing chamber 8. In this area one or more spray nozzles 7 are arranged, which spray upwards aligned to the processing gas flow and serve to insert the liquid containing the solid matter. The material temperature in a circular-like gas-material flow 15 ranges from 40 to 120° C. in a potential preferred embodiment.

Due to the high particle load in the core zone, conditions develop in the spray zone 22 very beneficial for the heat and material transfer. Furthermore it is achieved that the liquids largely precipitate at the particles and thus they are evenly wetted on the particle surface. The even wetting with a simultaneously high circulation of solid matter between the spray area and the reflux zone(s) 24 cause a very homogenous fluid film to form on the material particles. By the solidifying process the liquid becomes hard and the solid matter remains on the surface of the particles. This way the granulates grow very evenly and homogeneously resulting in a very narrow range of grain sizes and a homogeneous particle structure.

The processing gas 10 fed to the processing chamber 8 can carry a portion of the particles as well as fine matter and dust in form of solid material-laden exhaust 20 out of the processing chamber 8. In order to precipitate these particles at least one filter system optionally integrated in the exhaust system 19 can be used as a dedusting device 25 or one or more different types of dedusting devices 25 arranged downstream of the arrangement. In case of an integrated dedusting device 25, pressurized air impulses 18 can be used, for example, in order to return the retained particles into the processing chamber 8 in form of separated solid matter 21.

In contrast to fluidized bed arrangements with integrated filtering devices, the dust reflux is facilitated in that the upward directed processing gas flow is essentially locally limited and thus the particles to be refluxed can sink safely outside the gas flow. By the suction effect in the proximity of the gas entry gap 1 this mechanism is additionally enhanced. Alternatively particles separated from the exhaust can be refluxed into the process chamber 8. For this purpose, one or more feeding tubes 26 of different types can be arranged in the lower area of the inclined side walls 29. Due to the high speed of the processing gas flow in the proximity of the gas entry gap or gaps 1 the fine particles are suctioned and guided to the spray zone 22, where they are wetted with liquid and participate in the growth process.

One or more (preferably two) optionally implemented guiding metal sheets 16, (preferably approximately parallel to the gap opening or openings 1), can support the gas flow in a preferred embodiment, enhance the suction effect, and improve the feeding of solid matter into the spray zone 22. Any potentially occurring agglomeration effects are minimized, because in the spray zone 22 very high flow speeds and thus higher separation forces occur than in fluidized beds. This way, particles are separated and grow to very spherical granulates.

The flow profile of the processing gas in the processing chamber 8 also results in the fine particles refluxed from the optionally integrated filter arrangement into the processing chamber not falling back into the spray zone 22. This way the clogging of the fine particles and processes that form agglomerates resulting therefrom are avoided.

For continuous processing the arrangement can optionally be equipped with one or more different input systems 13 for solid matter. This way, for example particles can be introduced to the process, which can be produced, for example by milling granulates that are too big, or comprising granulates that are too small. These particles then serve as granulation seeds or as starting fill to shorten the start-up time. Additionally, here one or more additives (such as the above-mentioned releasing agents) can be introduced into the process in a solid form, to be embedded in the granulates.

Furthermore, the device can be provided with one or more output organs 4, in order to allow the removal of the particles from the processing chamber 8. This may for example occur by at least one overflow and/or by at least one volumetric output organ, e.g., a rotary valve or by a gravitational sifter, e.g., a zig-zag sifter impinged with sifting gas or a riser sifter.

Optionally, one or more milling devices 27 can be arranged in the processing chamber 8; however, preferably in the area of the reflux zone 24 at the sloped side wall or walls 29, in order to create seeds for the granulate formation process by milling sufficiently fine material. Furthermore, one or more reflux zones 24 can optionally be used for positioning one or more heaters and/or other heat transfer devices 28. For example, the device wall can be embodied as a hollow wall in order to use liquid or gaseous heat carriers to heat or cool the walls, for example. This way, optimal surface temperatures can be adjusted, in order to avoid product precipitations, for example.

In the processing chamber 8 or in the device parts located thereabove, the expansion zone 14 and the exhaust part 19, optionally one or more nozzles 6 can be arranged, which preferably spray downwards, but which can partially also spray upwards. Here, in addition or instead of the spraying by the nozzles(s) 7, the liquid formulation can be sprayed in, for example to create granulation seeds in the device by way of spray drying/spray solidification, in particular at the start-up phase. Alternatively via a part of the spray device 6 and/or 7 additives can be sprayed in the form of organic or inorganic coating means (particularly releasing agents) or other components in a liquid form and thus the granulate structure can be formed homogeneously (at least to a large extent). When the spray nozzle(s) 7 pass the temperature impinged supply air chamber(s) 17, optionally the liquid-conducting parts can be provided with insulation or one or more different cooling or heating systems 12, in order to prevent damage at the liquid formulation.

Exemplary Application 1: Granulation in an Aqueous Urea Solution

In a small technical spouted bed apparatus without air distribution bottom and with a cross-sectional area of 0.2 m2 60 kg/h of an aqueous urea solution is sprayed in and is converted into urea pellets by way of spray granulation. The temperature of the supply air amounts to 120° C.

The resulting urea pellets have the following features:
2.5 mm diameter with a tolerance of ±0.1 mm
Sphericity 92%
Smooth surface
Residual moisture 0.1%.

Exemplary Application 2: Granulation of a Urea Melt

In a small technical spouted bed apparatus without any air distribution bottom and with a cross-sectional area of 0.2 m2 50 kg/h of a urea melt is sprayed in and transferred into urea pellets by way of spray granulation (spray crystallization). The temperature of the supply air amounts to 90° C.

The resulting urea pellets have the following features:
2.5 mm diameter with a tolerance of ±0.2 mm
Sphericity 90%
Smooth surface Exemplary Application 3: Granulation of a Urea Melt Solution In a small technical spouted bed apparatus without an air distribution bottom and with a cross-sectional area of 0.2 m2 60 kg/h of a urea melt solution is sprayed in and transferred into urea pellets by way of spray granulation (spray crystallization). The liquid is heated above the melting point and has a water content of 10%. The air temperature amounts to 90° C.

The resulting urea pellets have the following features:
2.5 mm diameter with a tolerance of ±0.1 mm
Sphericity 90%
Smooth surface
Residual moisture 0.1%.

Exemplary Application 4: Coating the Urea Pellets

An amount of 30 kg/h urea pellets produced according to the exemplary embodiment 3 is coated with an organic releasing agents in a small technical spouted bed apparatus without any air distribution bottom and with a cross-sectional area of 0.2 m². Consequently the trend of untreated urea pellets to clog can be avoided.

The invention claimed is:

1. A method for producing urea pellets with a sphericity >75% and a defined residual moisture content ≦0.5%, in a spouted bed apparatus, comprising:

inserting a urea containing liquid with a temperature ranging from ambient temperature to above a melting temperature into a solid matter flow of the spouted bed apparatus and maintaining a solid gas material flow by a gas flow inserted from a bottom thereof, feeding the gas flow almost horizontally to the processing chamber of the spouted bed apparatus and deflecting the gas flow in the processing chamber, laterally feeding a material particle flow from an almost circular gas-material flow embodied in the processing chamber to gas jets in an entry area of the processing chamber, increasing a flow speed of the gas-material flow between the entry area of the gas flow in the processing chamber and a spray zone by adjustable guiding metal sheets or adjustable gap openings such that by a suction effect of the gas nozzles more material particles are entrained from the almost circular gas-material flow and thus the flow of high particle loads is adjusted in a controllable manner, and spraying a urea containing fluid into an area of high particle loads of the spray zone onto surfaces of particles of the material and dehydrated and granulated in the gas flow at temperatures up to maximally below a melting temperature of pure urea under at least one of uncontrolled or controlled heat or material transfer with a simultaneous separation, wherein the almost circular gas-material flow is adjusted by at least one fixed or adjustable gap opening or at least one fixed or adjustable guiding metal sheet, with at least one deflecting part that is adjustable, each being provided in an area of the gap-shaped opening(s) at a central area located inside the arrangement ensuring a curved guidance of the processing gas from the inlet area almost vertically to and in z direction of a longitudinal plane of the spouted bed apparatus through at least one gap opening and into the outlet area approximately parallel in reference to the longitudinal plane.

2. A method according to claim 1, wherein the urea-containing liquid is sprayed and dehydrated in the gas flow at temperatures up to maximally 130° C.

3. A method according to claim 1, wherein a urea solution, a urea suspension, a urea melt, or a urea melt solution is used as the urea-containing liquid.

4. A method according to claim 1, wherein processing gas is added to the spouted bed apparatus at temperatures ranging from −20° C. and 250° C.

5. A method according to claim 1, wherein a material temperature in the almost circular gas-material flow is maintained between 40° C. and 120° C.

6. A method according to claim 1, wherein at least one additive comprising organic or inorganic releasing agents is introduced in a liquid form to the spray zone to influence the granulated structure of the material.

7. A method according to claim 1, wherein solid matter precipitated from solid matter—laden exhaust is fed to the almost circular gas-material flow from at least one dedusting device.

8. A method according to claim 1, wherein the urea-containing liquid and the additives are sprayed in via at least one upwardly spraying nozzle or via at least one nozzle spraying in an arbitrary direction into the circular gas-material flow.

9. A method according to claim 1, wherein the almost circular gas-material flow can be adjusted by changing a size and shape of at least one gap opening or at least one guiding metal sheet provided in the processing chamber.

10. A method according to claim 1, wherein solid material particles are introduced into the almost circular gas-material flow via at least one entry system.

11. A method according to claim 1, wherein the side wall or side walls of the spouted bed apparatus are cooled or heated by at least one heat transfer device.

12. A method according to claim 1, wherein the urea pellets yielded are provided with at least one inorganic or organic releasing agents in at least one additional step within one of the later sections of the spouted bed apparatus itself or in an additional device.

13. A method according to claim 1, wherein the urea pellets yielded have a very narrow range of grain sizes deviating ±10% from a mean grain diameter or less.

14. A method according to claim 1, wherein at least one additive is introduced in a form of liquid organic releasing agents to condition the material.

15. A method according to claim 1, wherein the processing chamber, seen from a top, has at least an almost rectangular cross-section.

16. A method according to claim 1, wherein the almost circular gas-material flow in the spouted bed apparatus has a roller-like shape material flow.

17. A method for producing urea pellets with a sphericity >75% and a defined residual moisture content 0.5%, in a spouted bed apparatus, comprising:

inserting a urea containing liquid with a temperature ranging from ambient temperature to above a melting temperature into a solid matter flow of the spouted bed apparatus and maintaining a solid gas material flow by a gas flow inserted from a bottom thereof;

feeding the gas flow almost horizontally to the processing chamber of the spouted bed apparatus and deflecting the gas flow in the processing chamber;

laterally feeding a material particle flow from an almost circular gas-material flow embodied in the processing chamber to gas jets in an entry area of the processing chamber;

increasing a flow speed of the gas-material flow between the entry area of the gas flow in the processing chamber and a spray zone by adjustable guiding metal sheets or adjustable gap openings such that by a suction effect of the gas nozzles more material particles are entrained from the almost circular gas-material flow and thus the flow of high particle loads is adjusted in a controllable manner; and spraying a urea containing fluid into an area of high particle loads of the spray zone onto surfaces of particles of the material and dehydrated and granulated in the gas flow at temperatures up to maximally below a melting temperature of pure urea under at least one of uncontrolled or controlled heat or material transfer with a simultaneous separation;

wherein in a reflux zone of the almost circular gas-material flow, fine material is created via at least one milling device to form seeds for the granulate formation process.

* * * * *